US012671454B2

(12) United States Patent (10) Patent No.: US 12,671,454 B2
Bates et al. (45) Date of Patent: Jun. 30, 2026

(54) WEARABLE DEVICE WITH IN-EYE DISPLAY CAPABILITY

(71) Applicant: Snap Inc., Santa Monica, CA (US)

(72) Inventors: Robert Matthew Bates, Erie, CO (US); Ilteris Kaan Canberk, Marina Del Rey, CA (US); Brandon Carrillo, Playa Vista, CA (US); David G. Fliszar, Manhattan Beach, CA (US); Adam Douglas Greengard, Lafayette, CO (US); Kenneth Kubala, Boulder, CO (US); David Meisenholder, Manhattan Beach, CA (US); Jonathan M Rodriguez, II, Los Angeles, CA (US); Amit Singh, Los Angeles, CA (US); Samuel Thompson, Downers Grove, IL (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/762,237

(22) Filed: Jul. 2, 2024

(65) Prior Publication Data

US 2024/0353685 A1 Oct. 24, 2024

Related U.S. Application Data

(63) Continuation of application No. 18/234,989, filed on Aug. 17, 2023, now Pat. No. 12,066,634, which is a
(Continued)

(51) Int. Cl.
*G02B 27/01* (2006.01)
*G06T 11/60* (2026.01)
(Continued)

(52) U.S. Cl.
CPC ..... *G02B 27/0172* (2013.01); *G02B 27/0176* (2013.01); *G02B 27/0179* (2013.01);
(Continued)

(58) Field of Classification Search
None
See application file for complete search history.

(56) References Cited

U.S. PATENT DOCUMENTS

| 11,327,310 | B1 | 5/2022 | Bates et al. |
| 11,774,760 | B2 | 10/2023 | Bates et al. |
| | | (Continued) | |

OTHER PUBLICATIONS

"U.S. Appl. No. 16/728,801, Non Final Office Action mailed Jun. 3, 2021", 16 pgs.
(Continued)

*Primary Examiner* — Stephen T. Reed
(74) *Attorney, Agent, or Firm* — Schwegman Lundberg & Woessner, P.A.

(57) ABSTRACT

The present application discloses examples of various apparatuses and systems that can be utilized for augmented reality. According to one example, a wearable device that can optionally comprise: a frame configured for wearing by a user; one or more optical elements mounted on the frame; an array having a plurality of light emitting diodes coupled to the one or more optical elements, wherein the one or more optical elements and the array are mounted within a field of view of the user when the frame is worn by the user; and additional onboard electronic components carried by the frame including at least a battery that is configured to provide for electrically powered operation of the array.

18 Claims, 11 Drawing Sheets

Related U.S. Application Data continuation of application No. 17/718,783, filed on Apr. 12, 2022, now Pat. No. 11,774,760, which is a continuation of application No. 16/728,801, filed on Dec. 27, 2019, now Pat. No. 11,327,310.

(60) Provisional application No. 62/786,187, filed on Dec. 28, 2018.

(51) Int. Cl.
  *G09G 3/32*      (2016.01)
  *H04B 1/3827*    (2015.01)

(52) U.S. Cl.
  CPC ................ *G06T 11/60* (2013.01); *G09G 3/32* (2013.01); *H04B 1/385* (2013.01); *G02B 2027/0112* (2013.01); *G02B 2027/0138* (2013.01); *G02B 2027/014* (2013.01); *G02B 2027/0178* (2013.01); *G02B 2027/0187* (2013.01); *G09G 2330/021* (2013.01); *G09G 2354/00* (2013.01)

(56) References Cited

U.S. PATENT DOCUMENTS

| | | | | |
|---|---|---|---|---|
| 2013/0050432 A1* | 2/2013 | Perez | ....................... | G06F 3/011 |
| | | | | 348/47 |
| 2016/0209648 A1* | 7/2016 | Haddick | .............. | G04G 21/025 |
| 2019/0265476 A1 | 8/2019 | Blum et al. | | |
| 2019/0310481 A1* | 10/2019 | Blum | ................. | G02B 27/0172 |
| 2019/0369417 A1* | 12/2019 | Kniess | ................... | G02B 13/16 |
| 2020/0251638 A1* | 8/2020 | Morris | .................... | G06F 3/013 |
| 2020/0395503 A1* | 12/2020 | Wu | ..................... | H01L 33/0095 |
| 2021/0255482 A1* | 8/2021 | Ryner | ................ | G02B 27/0176 |
| 2022/0244544 A1 | 8/2022 | Bates et al. | | |
| 2023/0393402 A1 | 12/2023 | Bates et al. | | |

OTHER PUBLICATIONS

"U.S. Appl. No. 16/728,801, Non Final Office Action mailed Dec. 24, 2020", 15 pgs.

"U.S. Appl. No. 16/728,801, Notice of Allowance mailed Jan. 5, 2022", 8 pgs.

"U.S. Appl. No. 16/728,801, Response filed Mar. 18, 2021 to Non Final Office Action mailed Dec. 24, 2020", 11 pgs.

"U.S. Appl. No. 16/728,801, Response filed Oct. 4, 2021 to Non Final Office Action mailed Jun. 3, 2021", 19 pgs.

"U.S. Appl. No. 17/718,783, Advisory Action mailed Apr. 5, 2023", 3 pgs.

"U.S. Appl. No. 17/718,783, Examiner Interview Summary mailed Mar. 23, 2023", 2 pgs.

"U.S. Appl. No. 17/718,783, Final Office Action mailed Jan. 20, 2023", 17 pgs.

"U.S. Appl. No. 17/718,783, Non Final Office Action mailed Sep. 22, 2022", 16 pgs.

"U.S. Appl. No. 17/718,783, Notice of Allowance mailed May 25, 2023", 8 pgs.

"U.S. Appl. No. 17/718,783, Response filed Mar. 20, 2023 to Final Office Action mailed Jan. 20, 2023", 14 pgs.

"U.S. Appl. No. 17/718,783, Response filed Dec. 16, 2022 to Non Final Office Action mailed Sep. 22, 2022", 14 pgs.

"U.S. Appl. No. 18/234,989, Notice of Allowance mailed Apr. 10, 2024", 9 pgs.

* cited by examiner

WEARABLE DEVICE WITH IN-EYE DISPLAY CAPABILITY

PRIORITY

This application is a continuation of U.S. patent application Ser. No. 18/234,989, filed on Aug. 17, 2023, which is a continuation of U.S. patent application Ser. No. 17/718,783, filed on Apr. 12, 2022, which is a continuation of U.S. patent application Ser. No. 16/728,801, filed on Dec. 27, 2019, which claims the benefit of priority of U.S. Patent Application No. 62/786,187, filed Dec. 28, 2018, which are hereby incorporated by reference herein in their entireties.

BACKGROUND

Headsets and eyewear for virtual or augmented reality have been developed. These rely on projectors and waveguides for projection and display to the viewer. Unfortunately, projectors consume a relatively large amount of power during use. Due to this relatively large amount of power consumption, use time is limited or the headset and/or eyewear must be tethered with a power cable.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Among other things embodiments of the present disclosure facilitate a reduction of power consumption in providing a user of a wearable device (herein called "eyewear" or "smart eyewear" or "smart glasses") with an augmented reality experience. The systems and wearable devices disclosed herein reduce power consumption by using one or more arrays of light emitting diodes ("LEDs") that consume much smaller amounts of power relative to projectors used in other augmented reality devices. The one or more arrays of LEDs can be placed within or on a lens (also called an "optical element" herein) of the eyewear. The should be contrasted with other augmented reality devices utilizing projectors that have a dedicated display and utilize waveguides. With the present systems and wearable devices, no dedicated display or projector(s) are needed. Thus, the disclosed systems and wearable devices can facilitate reduced battery usage while still allowing the user to have a desired augmented reality experience.

The present inventors have proposed techniques and apparatuses with the use of such one or more arrays of LEDs that limit diffraction of an image to an acceptable level and also limit obscuration of the image to the viewer to an acceptable level. Worded differently, the present disclosure discloses arrays with LEDs appropriately spaced from one another and appropriately sized, shaped and otherwise configured to limit the diffraction and obscuration. The present disclosure also discloses various LED configurations that the present inventors have determined to be more aesthetically pleasing, "fun" and/or "real" to the user during augmented reality. Additionally, use of the eyewear in various augmented reality functions is disclosed herein including, for example, creating artwork (e.g., a portrait), messaging, instructing, game playing, altering perception of one's landscape (e.g., sky color), mapping, and/or guiding.

The description that follows includes systems, techniques, apparatuses, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known materials, instruction instances, protocols, structures, and techniques are not necessarily shown in detail.

One or more of the disclosed devices including the eyewear in some cases can perform processing of image data gathered using one or more cameras including cameras mounted to the eyewear that are configured for head and/or eye tracking. This data can be processed in manners discussed herein and can be used for the augmented reality experience of the user.

Figure 1A:
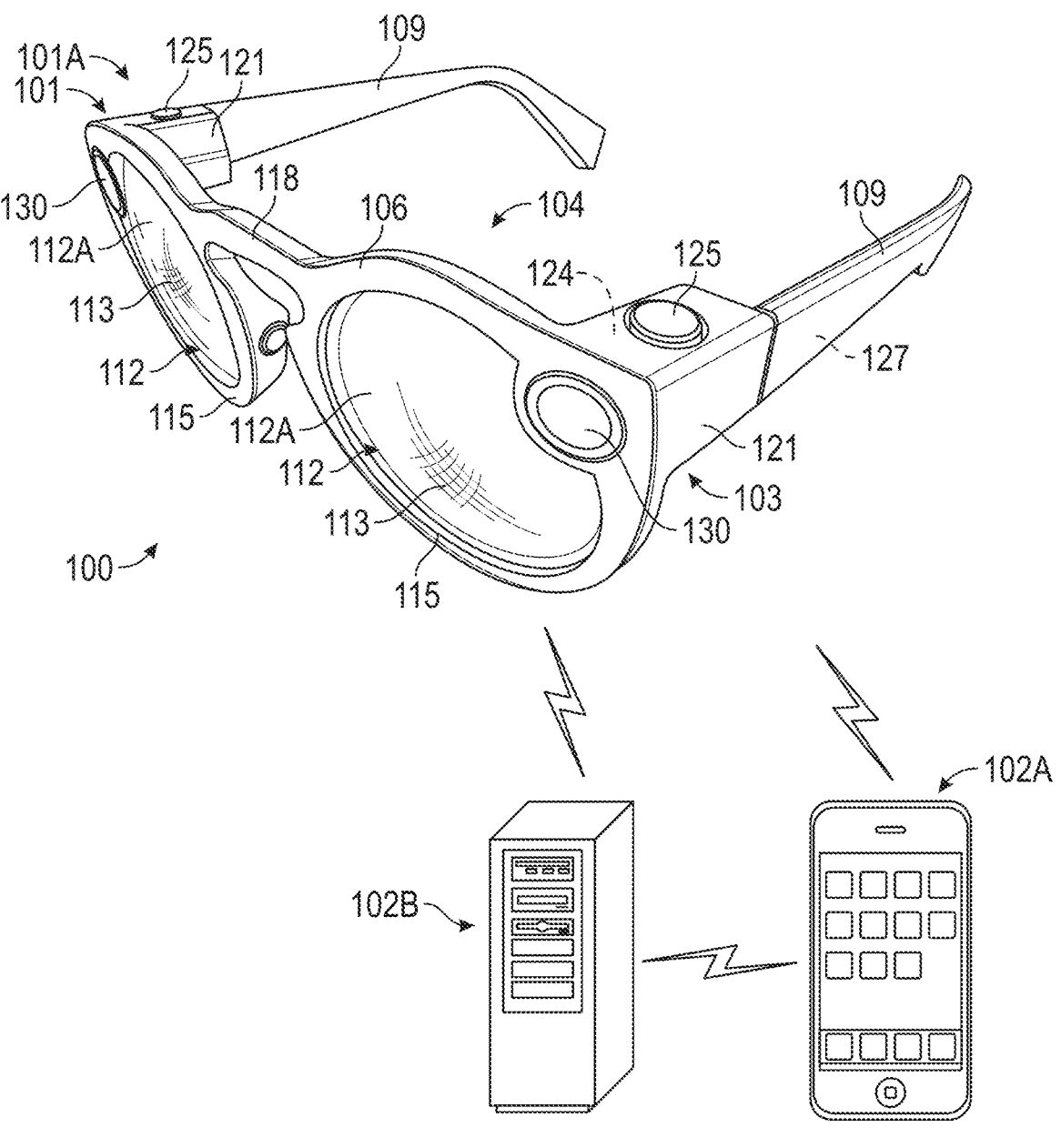
FIG. 1A is a perspective view of a system that can include a wearable device comprising smart glasses and further components such as a smartphone and/or the network device that can communicate with the smart glasses according to an example of the present application.

FIG. 1A shows a system 100 that includes smart glasses 101, a smartphone 102A and another device(s) 102B. In the example of FIG. 1A, the smart glasses 101 can comprise a wearable device 101A capable of providing a user when worn with an augmented reality experience as further described herein. The smart glasses 101 can be configured to communicate with other devices for augmented reality, messaging and other purposes. These other device can include the smartphone 102A and the another device(s) 102B.

FIG. 1A shows a front perspective view of the smart glasses 101 that can include a body 103 comprising a front piece or frame 106 and a pair of temples 109 connected to the frame 106 for supporting the frame 106 in position on a user's face when the smart glasses 101 are worn. The frame 106 can be made from any suitable material such as plastics or metal, including any suitable shape memory alloy.

The smart glasses 101 can carry a pair of optical elements 112 in the form of a pair of lenses 112A. These lenses 112A can be a clear plastic or glass, for example, having an on-axis transparency of greater than 90%. The lenses 112A may or may not be constructed for a prescription depending upon the preference of the user. The lenses 112A can be held by corresponding optical element holders in the form of a pair of rims 115 forming part of the frame 106. The rims 115 are connected by a bridge 118.

The frame 106 can include a pair of end pieces 121 defining lateral end portions of the frame 106. In the illustrated example, a variety of electronics components can be housed in one or both of the end pieces 121, as discussed in more detail below.

Figure 1B:
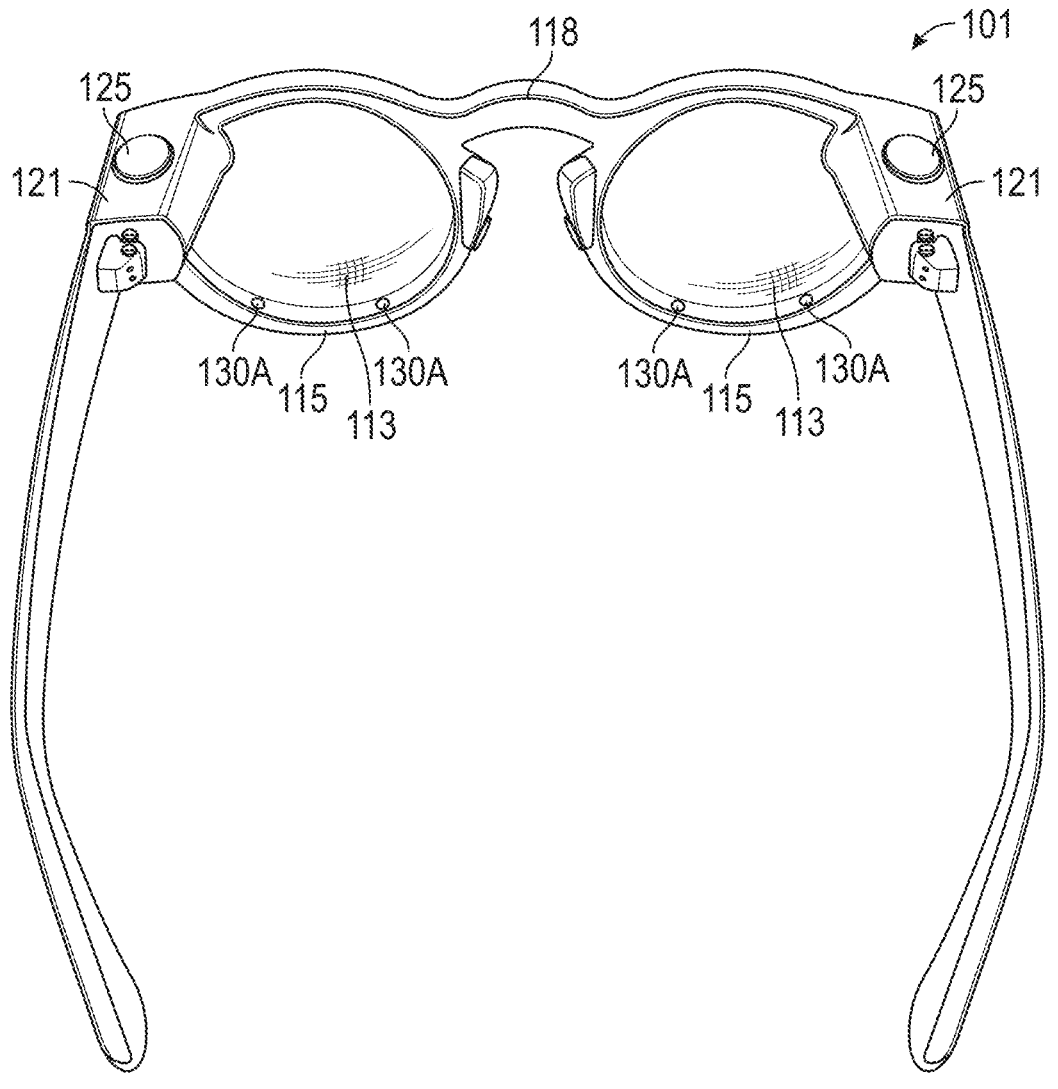
FIG. 1B is a second perspective view of the smart glasses having a frame and one or more optical elements held by the frame according to an example of the present application.

The temples 109 can be coupled to the respective end pieces 121. In this example, the temples 109 can be coupled to the frame 106 by respective hinges so as to be hingedly movable between a wearable mode (as shown in FIGS. 1A and 1B) and a collapsed mode in which the temples 109 are pivoted towards the frame 106 to lie substantially flat against it. In other embodiments, the temples 109 can be coupled to the frame 106 by any suitable means, or can be rigidly or fixedly secured to the frame 106 so as to be integral therewith.

The smart glasses 101 can have onboard electronics components 104 including a computing device, such as a computer 124, which can in different embodiments be of any suitable type so as to be carried by the body 103. In some embodiments, the computer 124 is at least partially housed in one or both of the temples 109 in addition to or in alternative to the frame 106. In the present embodiment, various components of the computer 124 can be housed in the lateral end pieces 121 of the frame 106.

The onboard electronics components 104 can include one or more processors, memory, wireless communication circuitry, and a power source, for example. These can be configured to support operation of the computer 124. The computer 124 comprises low-power circuitry, high-speed circuitry, image tracking and processing circuitry, communication circuitry and LED control circuitry, for example. Various embodiments may include these or additional elements in different configurations or integrated together in different ways. The computer 124 can have wireless communication circuitry that can communicate with the smartphone 102A and/or the additional device(s) 102B.

The onboard electronics components 104 additionally includes a battery 127 or other suitable portable power supply. The battery 127 can support operation of the computer 124 and one or more arrays 113 of LEDs that can be coupled to at least one of the optical elements 112 as further described herein below. In one embodiment, the battery 127 can be disposed in one of the temples 109 having an electrical connection to the onboard electronics components 104 carried by the frame 106. However, according to other examples, the battery 127 can be carried by one or both of the end pieces 121, being electrically coupled to the remainder of the computer 124 and other of the onboard electronics components 104 housed in the frame 106.

The smart glasses 101 can comprise commercially available spectacles from Snap Inc., available at https://www.spectacles.com/, for example. The smart glasses 101 can be camera-enabled, for various purposes including for providing augmented reality via head and/or eye tracking. In the illustrated example of FIG. 1A, the smart glasses 101 can include one or more cameras 130 mounted in one or both of the end pieces 121 and facing forwards so as to be aligned more or less with the direction of view of a wearer of the smart glasses 101. Camera(s) 130 can be mounted in the manner discussed to facilitate head tracking, for example.

FIG. 1B shows a further illustration of an example of the smart glasses 101 having additional one or more cameras 130A such as along one or more of the pair of rims 115, the bridge 118, etc. These cameras 130A can be mounted in any suitable position to capture movement of one or more of the eyes of a user for eye tracking purposes.

The cameras 130 and/or 130A can be configured to capture digital image(s). Operation of the cameras 130 and/or 130A can be controlled by a camera controller provided by the computer 124, image data representative of the digital image captured by the cameras 130 and/or 130A can be communicated to the image processor(s) including those on the with the smartphone 102A and/or the additional device(s) 102B, can be temporarily stored on a memory forming part of the computer 124, etc. As is further discussed herein subsequently, the image processor(s) can communicate with the computer 124 to control operation of the one or more arrays 113 of LEDs for providing the user with the augmented reality experience.

According to some examples such as those of FIGS. 1A and 1B, the smart glasses 101 can have one or more input and output devices permitting communication with and control of the cameras 130 and/or 130A or another component of the smart glasses 101 such as the one or more arrays 113 of LEDs. In particular, the smart glasses 101 include one or more input mechanisms for enabling user control of one or more functions of the smart glasses 101. For example, the input mechanism can comprise a button 125 mounted on the frame 106 so as to be accessible on top of one or both of the end pieces 121 for pressing by the user. In addition to any other functions that may be controlled by operation of the button 125, the button 125 in one example provides a photo trigger mechanism enabling the user to trigger photo capture by the camera 130. In further examples, the button 125 can be used to initiate or terminate an augmented reality experience such as by an extended depression of the button 125.

As discussed above, the smart glasses 101, the smartphone 102A and/or the another device(s) 102B can be used to support the augmented reality process through image processing, control of the operation of the one or more arrays 113 of LEDs, etc. Thus, the system 100 utilizes one or more computer enabled devices having one or more processors. The one or more processors and circuitry can comprise an image signal processor (ISP) or SW/HW imaging system, for example. Contemplated ISPs can utilize a field-programmable gate array (FPGA) integrated circuit, an application-specific digital circuit (ASIC), an application-specific standard products (ASSP) digital circuit, system on chip (SoC), for example.

Although the smartphone 102A and the additional device(s) 102B are shown in FIG. 1A, other examples contemplate systems utilizing other devices, alternative combinations of devices, etc. Thus, in some cases a smartphone 102A may be the only additional system device utilized or may not be utilized with the system. Other contemplated devices that can be utilized with the system 100 can be, for example, any wearable device, a digital camera, desktop computer, laptop, portable digital assistant (PDA), tablet, ultra book, netbook, laptop, server, multiprocessor system, microprocessor-based or programmable consumer electronic, game console, set-top box, a system of computer enabled devices, or any other computer enabled device. The additional device(s) 102B can comprise any of the devices listed above, a host device, etc.

The system 100 can communicate between the various devices via a network. The network can include an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, a social media network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

Figure 2:
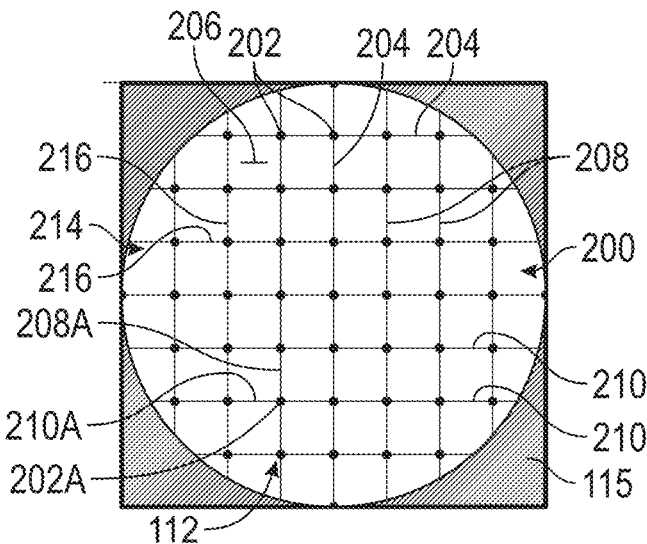
FIG. 2 is a schematic view of an array having a plurality of light emitting diodes coupled to the one or more optical elements according to an example of the present application.

FIG. 2 shows an example of an array 200 that can have a plurality of LEDs 202 (only a few of which are numbered), a plurality of electrically conductive elements 204 (e.g., traces) and a substrate 206. The array 200 can be coupled to the optical element 112 so as to be disposed between one or more of the pair of rims 115. According to some examples, the array 200 can be coupled to the optical element 112 such as by being constructed as part of the optical element 112 (e.g., so as to be positioned within the optical element 112). According to the illustrated example of FIG. 2, the array 200 utilizes the substrate 206, and thus, can be mounted to a surface of the optical element 112 by adhesive or other physical connection via the substrate 206.

As shown in FIG. 2, the array 200 can extend substantially across an entirety of the area of the optical element 112 including an entirety of a width thereof and an entirety of the length thereof. Thus, the array 200 can fully extend across a field of vision of the user when the eyewear are worn. The array 200 can include a plurality of columns 208 and a plurality of rows 210. Each of the plurality of columns 208 can include some of the plurality of LEDs 202 and some of the plurality of the plurality of electrically conductive elements 204. Similarly, each of the plurality of rows 210 can include some of the plurality of LEDs 202 and some of the plurality of electrically conductive elements 204. The each of the plurality of rows 210 can electrically interconnect with each of the plurality of columns 208 at or adjacent one (or a group as discussed in later examples) of the LEDs 202. Similarly, each of the plurality of columns 208 can electrically interconnect with each of the plurality of rows 210 at or adjacent one (or a group as discussed in later examples) of the LEDs 202. As a specific example, a first one 210A of the plurality of rows 210 can electrically interconnect with a first one 208A of the plurality of columns 208 at or adjacent a first 202A of the LEDs 202. Similar electrical interconnections can occur for other rows and columns as the array 202 comprises a repeating pattern 214.

Due to the configuration of the plurality of columns 208 and the plurality of rows 210 the array 200 can have a plurality of square shaped grids 216 having only the substrate 206 and/or the optical element 112 in the middle thereof. Put another way, the plurality of columns 208 and the plurality of rows 210 of the plurality of LEDs 202 can be spaced apart from one another and electrically connected in the grids 216. The edges of these grids 216 can be comprised of some of the plurality of LEDs 202 (e.g., at each corner) and some of the plurality of electrically conductive elements 204. A vast majority of a total area of the array 200 can comprise of only the substrate 206 (within the grids 216) with the plurality of columns 208 and the plurality of rows 210 only comprising a smaller portion of the total area of the array 200 so as not to be readily visible by the user.

The example of FIG. 2 is shown in a highly schematic manner with the array 200 greatly enlarged for understanding of the reader/viewer. Thus, it should be understood that the array 200 can have more than the plurality of columns 208 and the plurality of rows 210 illustrated in FIG. 2. In one example it is contemplated that the array 200 can have between 75 columns and 150 columns, inclusive, and the array 200 can have between 75 rows and 150 rows, inclusive. The columns and rows can be equal in number according to some examples or may differ in number. According to one example, the array 200 can have between 115 columns and 125 columns, inclusive, and the array 200 can have between 115 rows and 125 rows, inclusive.

The plurality of LEDs 202 can comprise any number, size and/or color LED such a single white LED at each intersection of the grids 216. This single white LED that can be electrically connected to others as a shift register according to some examples as will be further discussed subsequently with regard to the example of FIGS. 6 and 7. However, the plurality of LEDs 202 of the example of FIG. 2 can comprise a group (e.g., LED 202A) of LEDs at the intersection of the grids 216.

The LEDs can comprise micro-LEDs (e.g., having a size of less than about 100 microns, inclusive, in any largest dimension) according to some examples. Thus, according to some examples the intersection of the grids 216 including the micro-LEDs and the electrically conductive elements (both of the row and column that insect at the LEDs) can be less than about 100 microns in a largest dimension. According to some other examples, the LEDs can be as small as possible (e.g., 7 microns in a width dimension and 14 microns in a length (height) dimension). In other examples, the LEDs may not exceed 25 microns in the width dimension and 35 microns in the length (height) dimension. However, according to other examples the LEDs can comprise larger LEDs, being fewer in number, and having a size in a major dimension of less than about 300 microns.

The spacing of the plurality of LEDs 202 can be dictated by a relative spacing between the plurality of columns 208 and the plurality of rows 210. Put another way, this spacing can form the repeating pattern 214 and the size of the grids 216 previously discussed. This spacing can be referred to a pitch herein. According to one example, the pitch can be between 350 microns and 400 microns. Thus, in some examples, for each of the plurality of columns 208 and each of the plurality of rows 210, each of the plurality of LEDs 202 are spaced apart from a closest adjacent of the plurality of LEDs 202 center-to-center by at least between 350 microns and 400 microns, inclusive. However, pitches of up to 1000 microns center-to-center are contemplated. Additionally, spacing between the plurality of LEDs 202, and indeed, the plurality of columns 208 and the plurality of rows 210 need not be equal in all examples. For example, toward a middle portion of the array 200 the plurality of LEDs 202 and the plurality of columns 208 and the plurality of rows 210 can be more closely spaced so as to be bunched more closely relative to outer portions of the array 200 (adjacent the rims 115, for example).

The plurality of electrically conductive elements 204 can be formed of an electrically conductive materials such as, but not limited to, copper, silver, gold and alloys thereof. The plurality of electrically conductive elements 204 can have a same or differ in thickness for the plurality of columns 208 relative to the plurality of rows 210 according to some examples. The substrate 206 can comprise can be a clear plastic or glass, for example, having an on-axis transparency of greater than 90%. For example, various optical films are contemplated for use as the substrate 206.

Figure 2A:
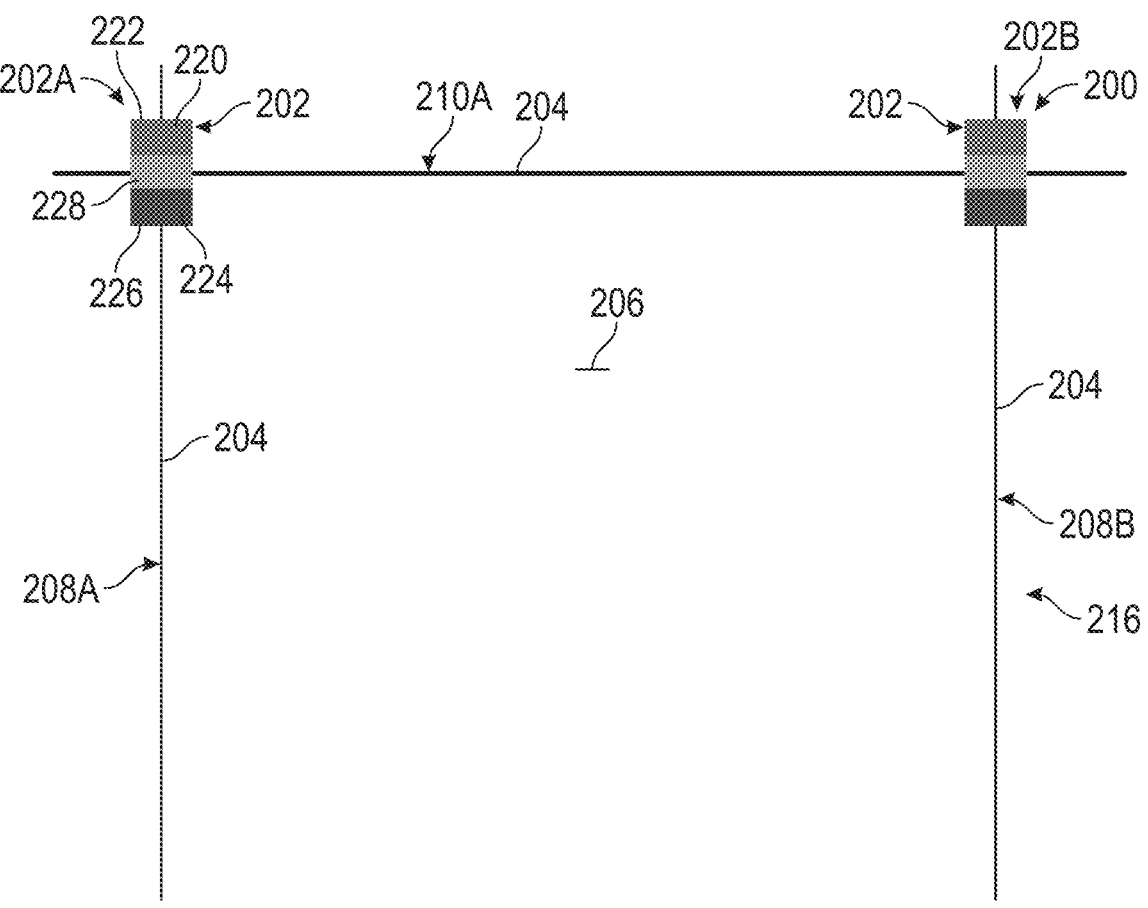
FIG. 2A is an enlarged schematic view of a portion of the array of FIG. 2 including two groups of the plurality of light emitting diodes located at a junction between electrically conductive traces, the plurality of light emitting diodes and traces can be organized in a row and a column configuration according to an example of the present application.

FIG. 2A shows an enlarged view of a portion of the array 200 of FIG. 2. Thus, FIG. 2A shows a portion of several grids 216 including a portion of some of the plurality of LEDs 202, a portion of some of plurality of electrically conductive elements 204, a portion of some of the substrate 206. FIG. 2A shows the first one 210A of the plurality of rows 210 can electrically interconnect with the first one 208A of the plurality of columns 208 at or adjacent the first 202A of the LEDs 202. Additionally, FIG. 2A shows the first one 210A of the plurality of rows 210 can electrically interconnect with a second one 208B of the plurality of columns 208 at or adjacent a second 202B of the LEDs 202.

As shown in the example of FIG. 2A, the each of the plurality of LEDs 202 (here in the enlargement 202A and 202B) has a rectangular shape with a greater length (height) dimension than a width dimension. The plurality of LEDs 202 can have a size that does not exceed 20 microns in the width dimension and 30 microns in the length (height) dimension according to the example of FIG. 2A. FIG. 2A further shows that according to some examples, the plurality of LEDs 200 can comprise a plurality of groups (also referred to as modules) of LEDs. Each of the groups of LEDs can comprise three LEDs, for example. Thus, the first 202A of the LEDs 202 can comprise three LEDs as can the second 202B. Additionally, as shown in the example of FIG. 2A, for each of the plurality of groups of LEDs, the three LEDs can comprise a red row line 220 at a first end portion 222, a blue row line 224 at a second end portion 226 and a green row line 228 disposed between the red row line 220 and the blue row line 224. Put another way, each of the plurality of groups of LEDs can comprise an RGB stack in a vertical arrangement to the viewer, with the red LED at the top, green LED in the middle and blue LED at the bottom.

Figure 3:
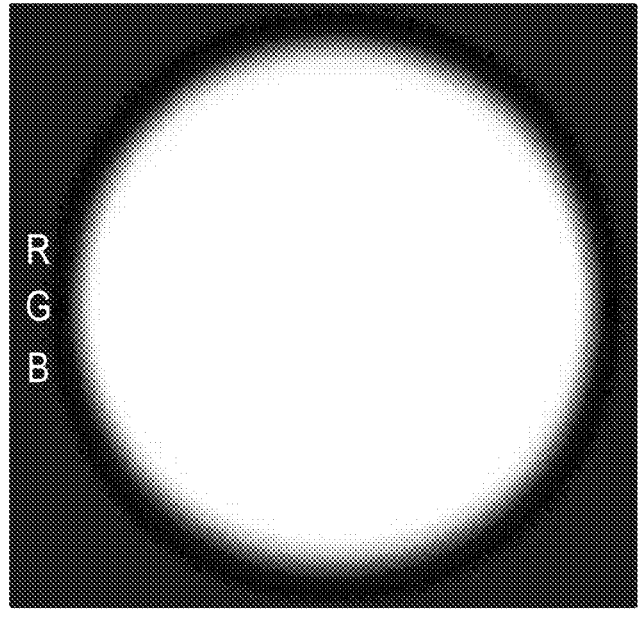
FIG. 3 is a photograph of a group of the plurality of light emitting diodes in the array emitting light having a red visible spectrum on a topmost first end portion, a blue visible spectrum on a lowermost second end portion and a green visible spectrum positioned between the red visible spectrum and the blue visible spectrum according to an example of the present application.

FIG. 3 illustrates an illuminated LED of the construct of FIG. 2A appearance to the viewer with the red LED portion indicated as "R" at the top, the green LED indicated as "G" in the middle and the blue LED indicated as "B" at the bottom of the orientation of the viewer. It should be noted that the image of FIG. 3 can be comprised of various groups of the plurality of LEDs illuminated in color tandem. Thus, for the top portion of the illumination of FIG. 3 only the red LEDs in the various groups are illuminated, and similarly, in the bottom portion of the illuminate only the blue LEDs in the various groups are illuminated, etc.

Figure 4:
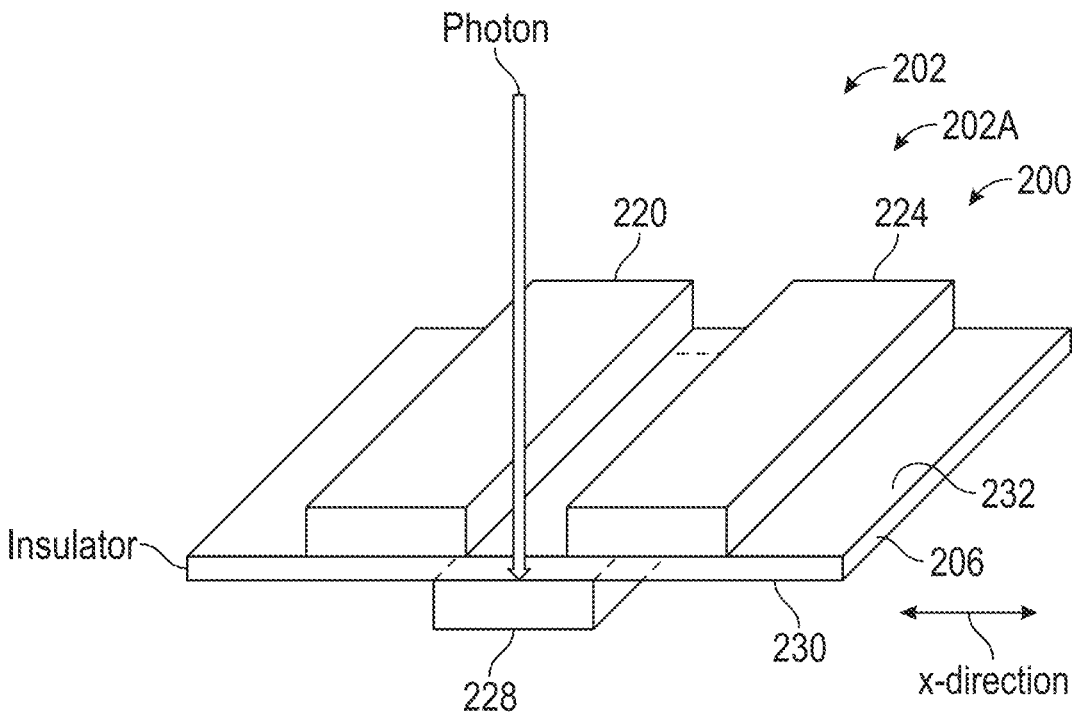
FIG. 4 is a schematic diagram of a single group of light emitting diodes with at least one light emitting diode located on a different layer of the array from others of the single group of light emitting diodes according to an example of the present application.

FIG. 4 shows one construct for each or some of the groups of the LEDs such as the first 202A of the LEDs 202. As shown in the example of FIG. 4, the green row line 228 can be disposed on a different layer of the array 200 from the blue row line 224 and the red row line 220. Put another way, the green row line 228 can be positioned on a second major surface 230 of the substrate 206 that opposes a first major surface 232 on which the blue row line 224 and the red row line 220 can be positioned. As shown in FIG. 4, the green row line 228 can be positioned in the x-direction indicated (vertical position to the viewer as discussed in FIG. 3) so as to overlap slightly in this x-direction with the blue row line 224 and the red row line 220. The amount of this overlap can be on the order of a few microns to less than one micron. The configuration of FIG. 4 can avoid having all three conductors (i.e. all three lines 220, 224 and 228) adjacent one another on a single layer. The arrangement of FIG. 4 can help avoid creating a diffractive slit between adjacent conductors (i.e. adjacent lines). As shown in FIG. 4, with the arrangement of FIG. 4 any photon that attempts to pass through the slit (i.e. the area between the blue row line 224 and the red row line 220) is blocked by the conductor (i.e. the green row line 228) on the other layer.

Figure 5:
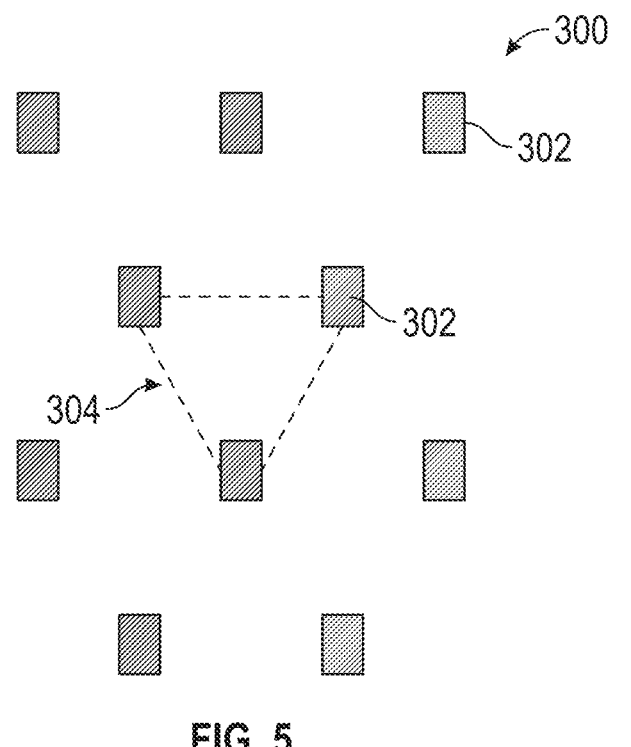
FIG. 5 is a schematic view of another array having the plurality of light emitting diodes coupled to the one or more optical elements according to an example of the present application.

FIG. 5 shows an array 300 according to another example of the present disclosure. The array 300 shows a plurality of LEDs 302, which can be constructed as previously described. For simplicity, FIG. 5 does not show the plurality of electrically conductive elements but it should be recognized that these would be utilized with the array 300 as could a substrate and other components previously discussed. As shown in FIG. 5, the array 300 can include a plurality of triangular grids 304, a single one of which is illustrated in phantom for user understanding. Thus, the array 300 can include a plurality of rows and columns as previously described with the understanding that the columns in FIG. 5 would be angled relative to the vertical reference of the viewer so as to be offset. It is contemplated that other grid shapes (or different combinations or sizes of grid shapes) can be utilized in other examples, such shapes can include but are not limited to: polygons—(e.g., triangular, square, rectangle, diamond, pentagon, hexagon, heptagon, octagon, etc.), circular curves—(e.g., arcs, circles, etc.) and noncircular curves—(e.g., spiral, ellipse, heart, oval, etc.). It is also contemplated that grid shapes can be irregular (be random so as to have no identifiable shape), shifting shapes along the area of the optical element (i.e. can shift from hexagon to spiral for example), various combinations of irregular and shifting, etc.

Figure 6:
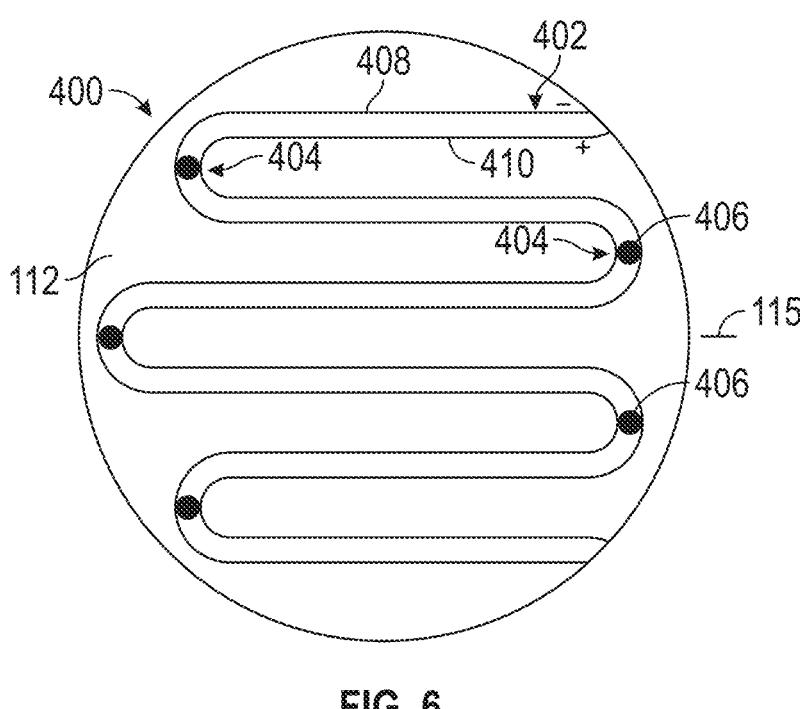
FIG. 6 is a schematic view of another array with the plurality of light emitting diodes and a bus having a sinuously curved shape along a length and a width of the one or more optical elements according to an example of the present application.

FIG. 6 shows an array 400 coupled to one optical element 112 within the rims 115. The array 400 can comprise a bus 402 having a sinuously curved shape along a length and a width of the optical element 112. In particular, the bus 402 can extend back-and-forth with a number of curves 404 in a vertical dimension and a longitudinal dimension along the optical element 112 to the perception of a viewer. The curves 404 can occur adjacent the rims 115 near an edge of the optical element 112.

The array 400 can include a plurality of LEDs 406 placed on the bus 402 at intervals so as to be spaced apart along the length and width of the bus 402. For simplicity of understanding of the view only a few LEDs are shown in FIG. 6. It should be recognized that the array 400 would have a plurality of LEDs 406 placed at various locations with respect to the optical element 112.

FIG. 6 shows the bus 402 having a first electrically conductive element 408 connected to a negative voltage supply and a second electrically conductive element 410 connected to a positive voltage supply. However, other arrangements for the electrically conductive elements 408, 410 are contemplated. The first electrically conductive element 408 can be spaced from but can have a mirror curvature to that of the second electrically conductive element 410.

Figure 7:
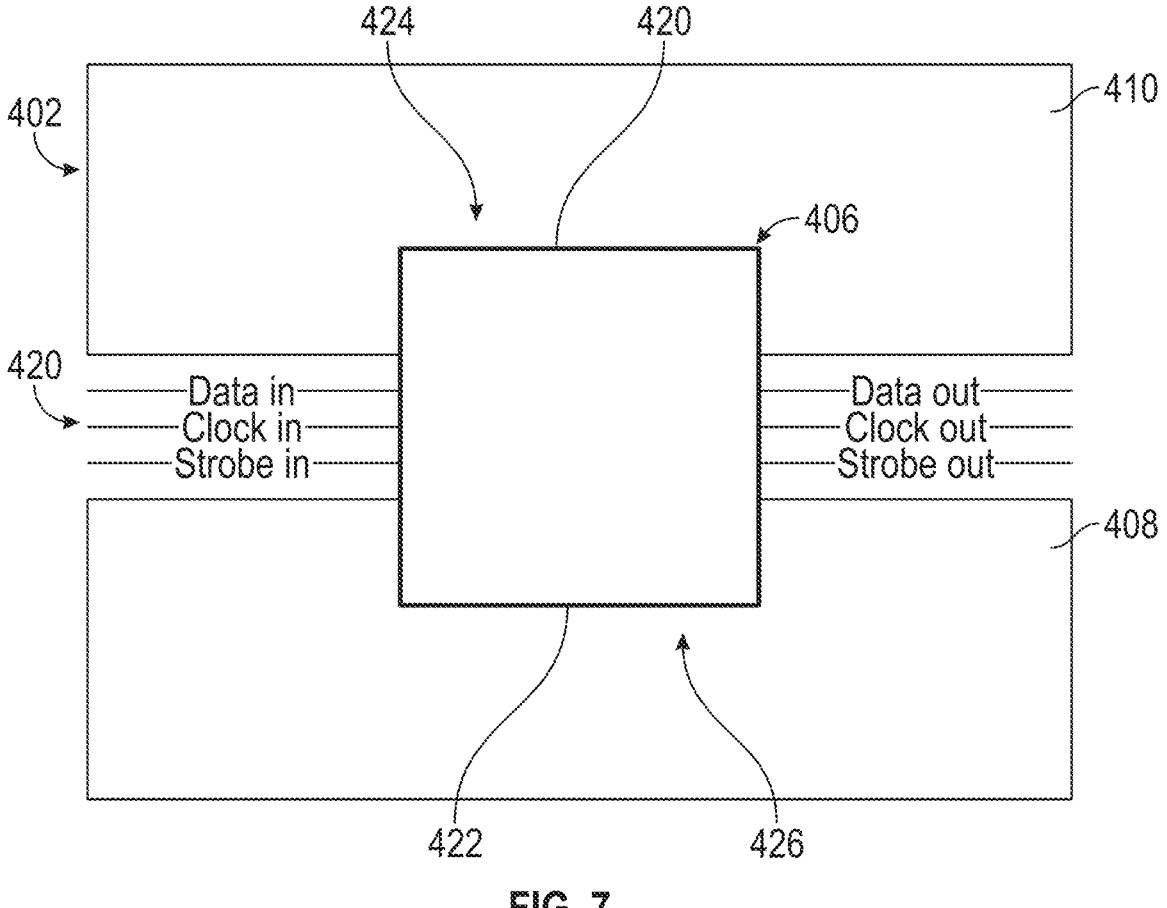
FIG. 7 is an enlarged schematic view of one group of the plurality of light emitting diodes from FIG. 6, the plurality of light emitting diodes can be electrically connected together as a shift register, and each of the plurality of light emitting diodes can be a white light emitting diode module that is electrically connected to a first electrically conductive trace and a second electrically conductive trace according to an example of the present application.

FIG. 7 shows one of the plurality of LEDs 406 that can be utilized with the array 400 and the bus 402 of FIG. 6. The LEDs 406 can comprise a white LED or group of white LEDs, for example. This LED or group of LEDs can have a size and shape as previously discussed (e.g. can have a rectangular or square shape and can be of less than or equal to 20×20 microns). A first portion 420 of the LEDs 406 can be connected to the positive voltage supply and a second portion 422 of the LEDs 406 can be connected to the negative voltage supply. In a first region 424 around and in contact with the first portion 420 of the LEDs 406, the second electrically conductive element 410 can have a relatively larger area (relative to the LEDs 406 size) and can comprise a solid pour of indium-tin oxide, for example. Similarly, in a second region 426 around and in contact with the second portion 422 of the LEDs 406, the first electrically conductive element 408 can have a relatively larger area (relative to the LEDs 406 size) and can comprise a solid pour of indium-tin oxide, for example. Thus, as shown in FIG. 7, each of the LEDs comprises a white LED or white LED module (group) that can be electrically connected to the first electrically conductive element 408 and the second electrically conductive element 410 at different opposing end portions (first portion 420 and second portion 422).

As shown in the example of FIG. 7, the LEDs 406 can be electrically connected to the bus 402 so as to be electrically connected together to comprise a shift register 420. In such arrangement, the LEDs 406 can sequentially communicate (e.g., have data in, data out, clock in, clock out, strobe in, strobe out) in a coordinated manner. The configuration of FIG. 7 can also configured for various other operational modes including pulse width modulation (PMW), strobe, etc.

FIGS. 8-12 show various examples of augmented reality for a user using the arrays of LEDs and eyewear previously discussed herein. These examples show various augmented reality functions including creating artwork (e.g., a portrait), messaging, instructing, game playing, altering perception of the user's surroundings (e.g., sky color), mapping, and/or guiding. In one example, one or more of the plurality of LEDs can be configured to illuminate a desired portion(s) of the optical element(s)/user's vision according to a signal indicative of the at least one of head tracking or eye tracking of the user discussed previously herein. This can create an augmented reality experience for the user when wearing the eyewear and viewing through the one or more optical elements.

Figure 8:
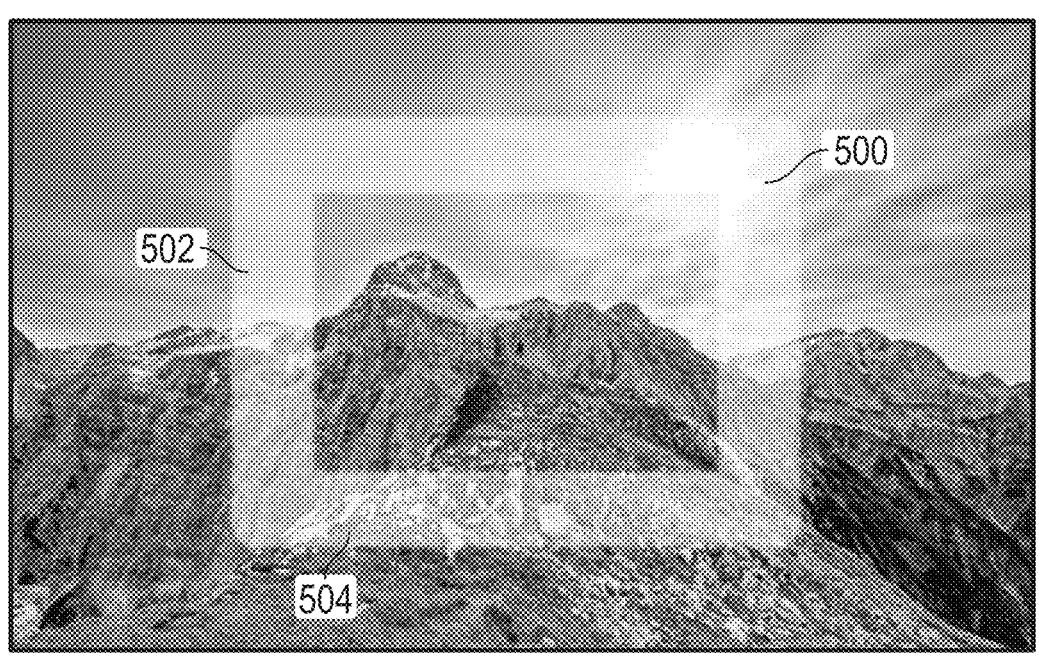
FIG. 8 is an augmented reality view of a user through the one or more optical elements of the wearable device depicting an example illumination of a desired portion of the one or more optical elements by a specific group of the plurality of light emitting diodes, according to some example embodiments.

FIG. 8 shows an augmented reality view of a user through the one or more optical elements of the wearable device as previously described. FIG. 8 depicts an example illumination of a desired portion 500 of the one or more optical elements by a specific group 502 of the plurality of LEDs. As shown in FIG. 8, the desired portion 500 can be configured to frame an individual within the view of the user, for example. Thus, the specific group 502 can have a desired shape, in the example of FIG. 8, a frame shape 504 within the vision of the user.

Figure 9:
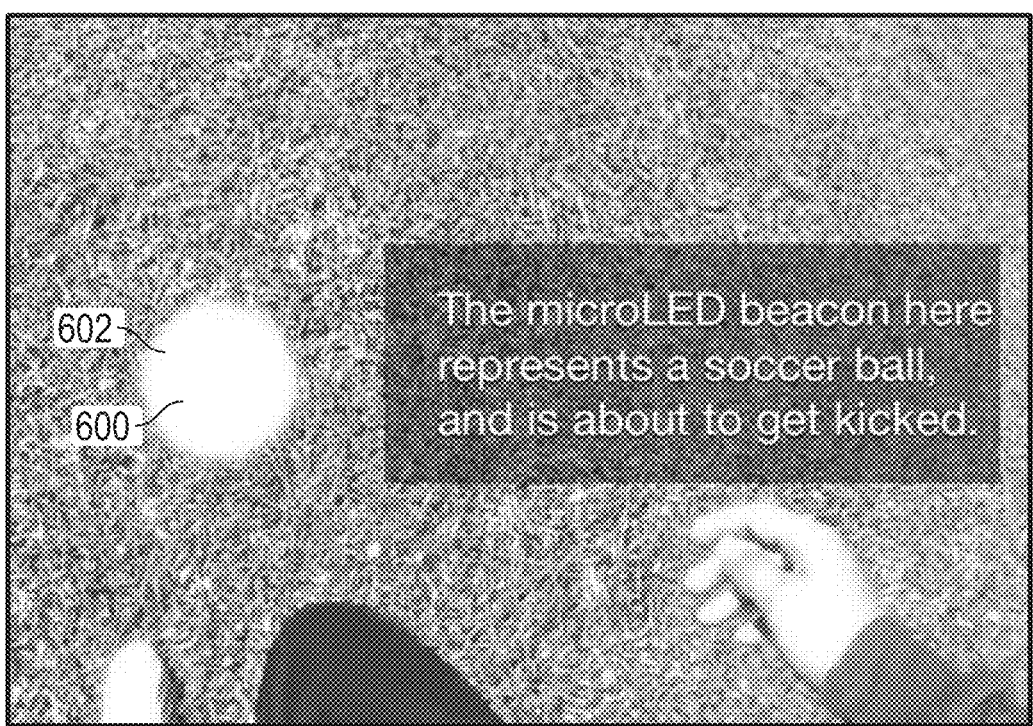
FIG. 9 is another augmented reality view of the user through the one or more optical elements of the wearable device with another illumination of the desired portion of the one or more optical elements by a specific group of the plurality of light emitting diodes, according to some example embodiments.

FIG. 9 shows an augmented reality view of a user through the one or more optical elements of the wearable device as previously described. Similar to FIG. 8, FIG. 9 depicts an example illumination of a desired portion 600 of the one or more optical elements by a specific group 602 of the plurality of LEDs. As shown in FIG. 9, the specific group 602 can comprise a beacon having a desired shape, here corresponding to that of a soccer ball (circle). This "soccer ball" can be used in augmented reality game play, for example, and can be "kicked" by the user into motion across the one or more optical elements. Groups of individuals using wearable devices could play with the soccer ball in a coordinated manner using the systems and techniques discussed herein.

Figure 10:
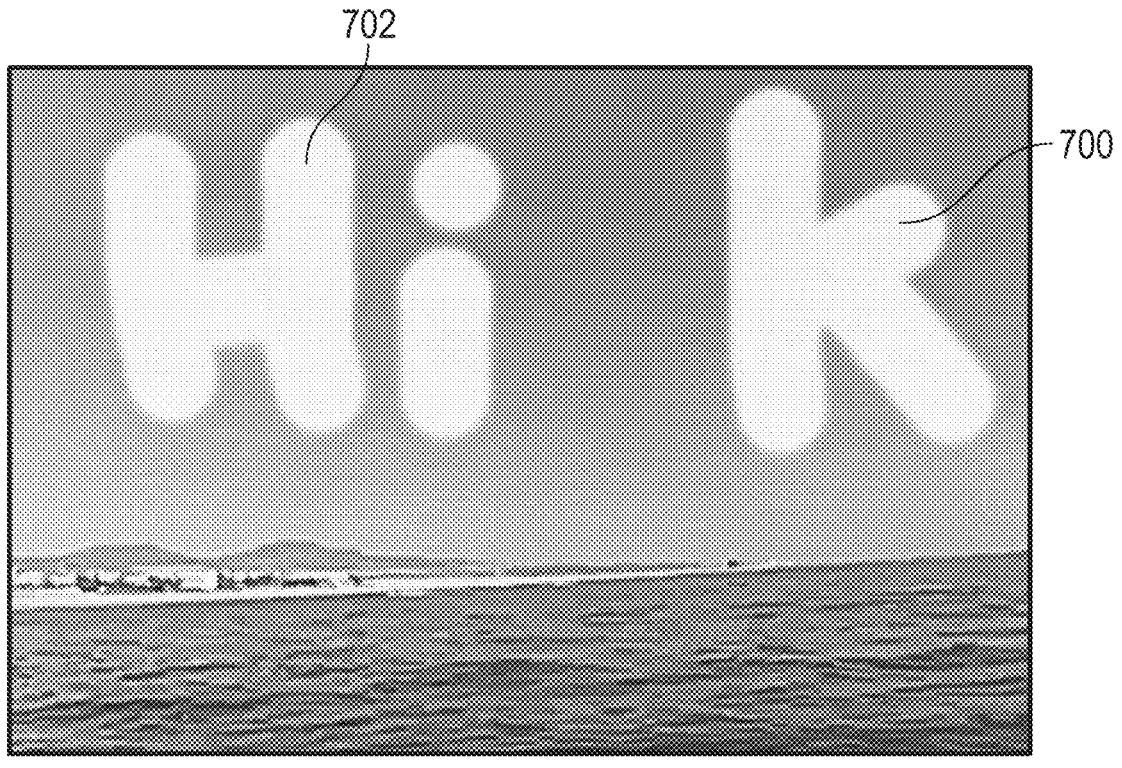
FIG. 10 is yet another augmented reality view of the user through the one or more optical elements of the wearable device with yet another illumination of the desired portion of the one or more optical elements by a specific group of the plurality of light emitting diodes, according to some example embodiments.

FIG. 10 shows another augmented reality view through the one or more optical elements of the wearable device as previously described. FIG. 10 shows an example where a desired portion 700 of the one or more optical elements is illuminated by a specific group 702 the plurality of LEDs to have a desired shape corresponding to a message. Such message could be the result of hand movements of the augmented reality user, hand or other movement of another individual within the vision of the augmented reality user, someone communicating with the augmented reality user via a communication network (example discussed in FIG. 1A and subsequently), etc. As an example, when wearing the wearable device, if the user was to receive a text message this could be displayed not only on the user's mobile device (which may or may not be in the vision of the user) but can also be illuminated on the one or more optical elements via the specific group(s) of the plurality of LEDs.

Figure 11:
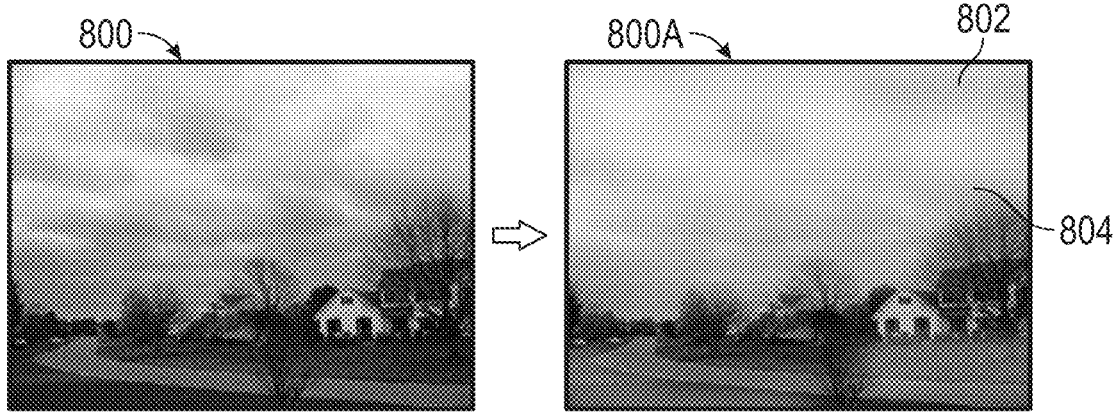
FIG. 11 are contrasting views between a reality view of the user through the one or more optical elements and an augmented reality view of the user through the one or more optical elements of the wearable device where portions of the sky coloring have been changed by illumination of a desired portion of the one or more optical elements by a specific group of the plurality of light emitting diodes, according to some example embodiments.

FIG. 11 shows contrasting views between a reality view 800 of the user (which may or may not be through the optical elements) and an augmented reality view 800A of the user through the optical elements of the wearable device where portions of the sky coloring 802 in the augmented reality view 800A have been changed by illumination of a desired portion 804 of the optical elements by a specific group 806 of the plurality of LEDs. This process uses cameras and image processing of the wearable device and/or other system devices to identify a sky line and landscape features in order to segment the sky from the land and other structures for illumination in a desired color.

Figure 12:
FIG. 12 is yet a further augmented reality view of the user through the one or more optical elements of the wearable device with yet another illumination of the desired portion of the one or more optical elements by a specific group of the plurality of light emitting diodes, according to some example embodiments.

FIG. 12 shows another augmented reality view through the one or more optical elements of the wearable device as previously described. FIG. 12 shows an example where the techniques and arrays discussed herein can be used for guiding the augmented reality user on a walk. FIG. 12 shows an example where a desired portion 900 of the one or more optical elements is illuminated by a specific group 902 the plurality of LEDs. In the example of FIG. 12, however, a position of the specific group 902 of the one or more optical elements shifts on the one or more optical elements/in the user's field of vision according to a signal received by the wearable device. The signal can be indicative of where the user should walk according to guiding directions in the example of FIG. 12. Put another way, the plurality of LEDs can be illuminated in a coordinated manner to shift an illumination location along the one or more optical elements according to the signal. Although illustrated as a beacon in the example of FIG. 12 it is contemplated the specific group 902 could have any desired shape such as an arrow, a human type shape, etc.

Modules, Components, and Logic

Certain embodiments are described herein as including logic or a number of components, modules, devices or mechanisms. Modules can constitute hardware modules. A "hardware module" is a tangible unit capable of performing certain operations and can be configured or arranged in a certain physical manner. In various example embodiments, computer systems (e.g., a standalone computer system, a client computer system, or a server computer system) or hardware modules of a computer system (e.g., at least one hardware processor, a processor, or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented modules that operate to perform operations or functions described herein. As used herein, "processor-implemented module" refers to a hardware module implemented using processors.

Similarly, the methods described herein can be at least partially processor-implemented, with a particular processor or processors being an example of hardware. For example, at least some of the operations of a method can be performed by processors or processor-implemented modules. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Applications

The wearable device as previously described can include one or more a cameras that can be used with the techniques, devices and systems as previously described. The cameras can comprise imaging devices coupled to the wearable device capable of capturing digital images, one or more successive digital images, or a video stream, etc. A selectable user interface element (example discussed above) or other implement can be used to initiate capture of image(s) or a video stream. This image(s) or video stream can be passed to systems for processing according to the one or more techniques described in the present disclosure for augmented reality use.

Many varieties of applications (also referred to as "apps") can be utilized with the systems described herein, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the system can include one or more devices with a messaging app, an audio recording app, a camera app, an image editing app, a book reader app, a media app, a fitness app, a file management app, a location app, a browser app, a settings app, a contacts app, a telephone call app, or other apps (e.g., gaming apps, social networking apps, biometric monitoring apps). In another example, the system can include one or more devices with a social messaging and display app such as SNAPCHAT® that, consistent with some embodiments, allows users to edit digital images and exchange ephemeral messages that include media content. In this example, the social messaging and display app can incorporate aspects of embodiments described herein. For example, in some embodiments the social messaging application includes an ephemeral gallery of media (including emojis, art, etc.) created by users of the social messaging application. These galleries may consist of videos or pictures posted by an augmented reality user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present invention.

In some embodiments, an ephemeral message system may include messages having ephemeral digital images (i.e. video clips or still image(s)) which are deleted following a deletion trigger event such as a viewing time or viewing completion.

Software Architecture

Figure 13:
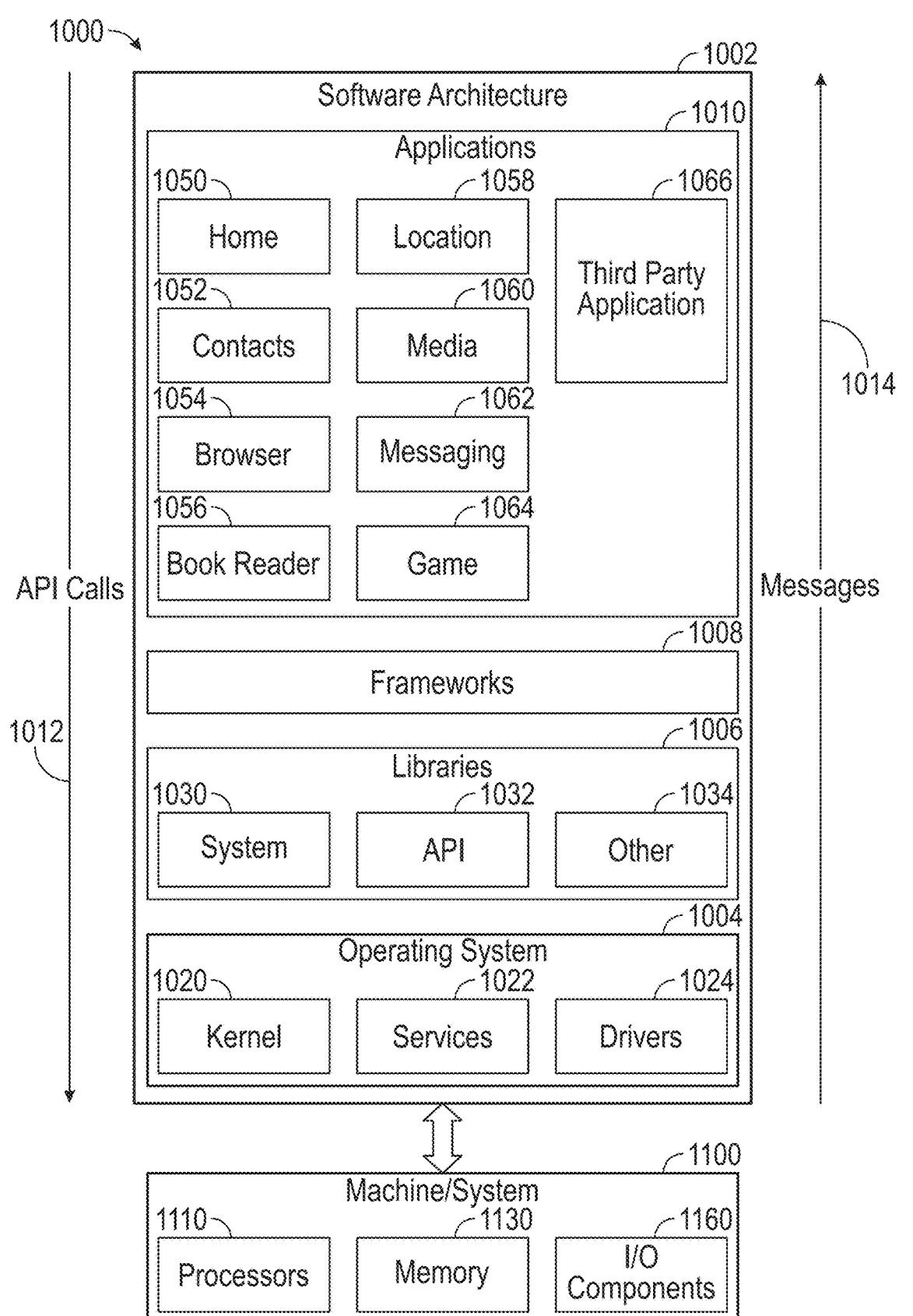
FIG. 13 is a block diagram illustrating an example of a software architecture that may be installed on a machine such as the wearable device, according to some example embodiments.

FIG. 13 is a block diagram 1000 illustrating an architecture of software 1002, which can be installed on the system and/or devices described above. FIG. 13 is merely a non-limiting example of a software architecture, and it will be appreciated that many other architectures can be implemented to facilitate the functionality described herein. In various embodiments, the software 1002 is implemented by hardware such as the machine 1100 of FIG. 14 that includes processors 1110, memory 1130, and I/O components 1150. In this example architecture, the software 1002 can be conceptualized as a stack of layers where each layer may provide a particular functionality. For example, the software 1002 includes layers such as an operating system 1004, libraries 1006, frameworks 1008, and applications 1010. Operationally, the applications 1010 invoke application programming interface (API) calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphic user interface (GUI) functions, high-level resource management, high-level location services, and so forth. The frameworks 1008 can provide a broad spectrum of other APIs that can be utilized by the applications 1010, some of which may be specific to a particular operating system or platform.

In an example embodiment, the applications 1010 include a home application 1050, a contacts application 1052, a browser application 1054, a book reader application 1056, a location application 1058, a media application 1060, a messaging and display application 1062, a game application 1064, and a broad assortment of other applications such as a third party application 1066. According to some embodiments, the applications 1010 are programs that execute functions defined in the programs. Various programming languages can be employed to create the applications 1010, structured in a variety of manners, such as object-oriented programming languages (e.g., Objective-C, Java, or C++) or procedural programming languages (e.g., C or assembly language). In a specific example, the third party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third party application 1066 can invoke the API calls 1012 provided by the operating system 1004 to facilitate functionality described herein.

Example Machine Architecture and Machine-Readable Medium

Figure 14:
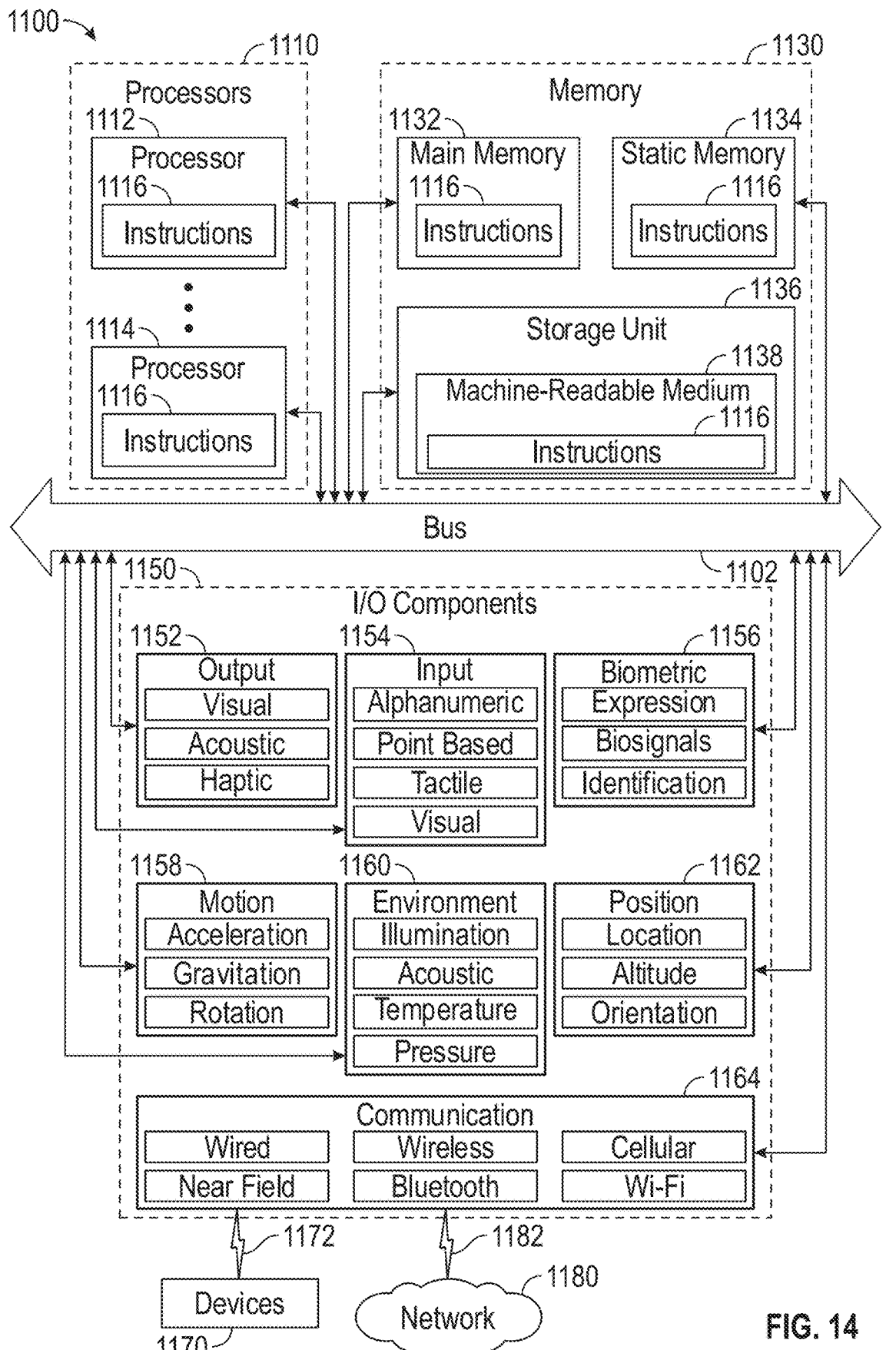
FIG. 14 is a block diagram presenting a diagrammatic representation of a machine in the form of a computer system within which a set of instructions may be executed for causing the machine to perform any of the methodologies discussed herein, according to an example embodiment.

FIG. 14 is a block diagram illustrating components of the machine or system 1100, according to some embodiments, able to read instructions (e.g., processor executable instructions) from a machine-readable medium (e.g., a non-transitory processor-readable storage medium) and perform any of the methodologies discussed herein. Specifically, FIG. 14 shows a diagrammatic representation of the machine 1100 in the example form of a computer system, within which instructions 1116 (e.g., software, a program, an application, an applet, an app, or other executable code) for causing the machine or system 1100 to work in concert with or as part of the methods and systems previously described to execute any of the methodologies discussed. In alternative embodiments, the machine or system 1100 operates as a standalone device or can be coupled (e.g., networked) to other machines. In a networked deployment, the machine or system 1100 may operate in the capacity of a server machine or a client machine in a server-client network environment, or as a peer machine in a peer-to-peer (or distributed) network environment. The machine or system 1100 can comprise, but not be limited to, smart glasses, a digital camera, a server computer, a client computer, a personal computer (PC), a tablet computer, a laptop computer, a netbook, a set-top box (STB), a personal digital assistant (PDA), an entertainment media system, a cellular telephone, a smartphone, a mobile device, another type of wearable device other than smart glasses (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 1100 is illustrated, the term "machine" or "device" or "apparatus" shall also be taken to include a collection (plurality) of such that individually or jointly execute the instructions 1116 to perform any of the methodologies discussed herein.

In various embodiments, the machine or system 1100 comprises processors 1110, memory 1130, and I/O components 1150, which can be configured to communicate with each other via a bus 702. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 1112 and a processor 1114 that may execute the instructions 1116. The term "processor" is intended to include multi-core processors that may comprise two or more independent processors (also referred to as "cores") that can execute instructions contemporaneously. Although FIG. 14 shows multiple processors, the machine or system 1100 may include a single processor with a single core, a single processor with multiple cores (e.g., a multi-core processor), multiple processors with a single core, multiple processors with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine or system 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown in an example embodiment to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by the machine or system 1100 (e.g., the devices previously discussed), such that the instructions, when executed by processors of the machine or system 1100 (e.g., processors 1110), cause the machine 1100 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 14. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine or system 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1170 may be another machine or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1180 or a portion of the network 780 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine or system 1100, and includes digital or analog communications signals or other intangible media to facilitate communication of such software.

Furthermore, the machine-readable medium 1138 is nontransitory (in other words, not having any transitory signals) in that it does not embody a propagating signal. However, labeling the machine-readable medium 1138 "non-transitory" should not be construed to mean that the medium is incapable of movement; the medium should be considered as being transportable from one physical location to another. Additionally, since the machine-readable medium 1138 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

EXAMPLES

The below Examples can optionally comprise any one or any combination of the following:

Example 1 is a wearable device that can optionally comprise: a frame configured for wearing by a user; one or more optical elements mounted on the frame; an array having a plurality of light emitting diodes coupled to the one or more optical elements, wherein the one or more optical elements and the array are mounted within a field of view of the user when the frame is worn by the user; and additional onboard electronic components carried by the frame including at least a battery that is configured to provide for electrically powered operation of the array.

Example 2 can optionally comprise the wearable device of Example 1, wherein the array optionally comprises a plurality of columns and a plurality of rows of the plurality of light emitting diodes spaced apart from one another and electrically connected in grids.

Example 3 can optionally comprise the wearable device of Example 2, wherein for each of the plurality of columns and each of the plurality of rows, each of the plurality of light emitting diodes can be spaced apart from one another by at least between 350 microns and 400 microns, inclusive.

Example 4 can optionally comprise the wearable device of Example 2, wherein the array optionally can have between 75 columns and 150 columns, inclusive, and wherein the array can have between 75 rows and 150 rows, inclusive.

Example 5 can optionally comprise the wearable device of any one or combination of Examples 1-4, wherein optionally each of the plurality of light emitting diodes can have a rectangular shape and can have a size that does not exceed 20 microns in a width dimension and 30 microns in a height dimension.

Example 6 can optionally comprise the wearable device of any one or combination of Examples 1-5, wherein the plurality of light emitting diodes can optionally comprise a plurality of groups of three light emitting diodes, wherein for each of the plurality of groups, the three light emitting diodes can optionally comprise a red row line at a first end portion, a blue row line at a second end portion and a green row line positioned between the red row line and the blue row line.

Example 7 can optionally comprise the wearable device of Example 6, wherein the green row line can be disposed on a different layer of the array from the blue row line and the red row line.

Example 8 can optionally comprise the wearable device of any one or combination of Examples 1-7, wherein the array can optionally comprise a bus having a sinuously curved shape along a length and a width of the one or more optical elements.

Example 9 can optionally comprise the wearable device of Example 8, wherein the plurality of light emitting diodes can be positioned along the bus and electrically connected together as a shift register.

Example 10 can optionally comprise the wearable device of Example 9, wherein at least some of the plurality of light emitting diodes comprise a white light emitting diode module that is electrically connected to a first electrically conductive trace and a second electrically conductive trace.

Example 11 can optionally comprise the wearable device of any one or combination of Examples 1-10, wherein the onboard electronic components carried by the frame can optionally include one or more cameras configured for at least one of head tracking or eye tracking of the user.

Example 12 can optionally comprise the wearable device of Example 11, wherein one or more of the plurality of light emitting diodes can optionally be configured to illuminate a desired portion of the one or more optical elements according to a signal derived from the at least one of head tracking or eye tracking to create an augmented reality for the user when wearing the frame and viewing through the one or more optical elements.

Example 13 can optionally be the wearable device of Example 12, wherein the one or more of the plurality of light emitting diodes can optionally be illuminated in a coordinated manner to shift an illumination location along the array and the one or more optical elements according to the signal derived from the at least one of head tracking or eye tracking.

Example 14 can optionally be the wearable device of Example 12, wherein the onboard electronic components optionally can further include: an image processor configured to receive an initial digital image from the one or more cameras; a communication module coupled to the image processor; and a memory coupled to the image processor and storing instructions that, when executed by the image processor, cause the wearable device to: perform a first one or more edits on the initial digital image, generate, based on the first one or more edits, a modified digital image, and transmit the modified digital image using the communication module as a basis to illuminate the desired portion of the one or more optical elements according to the modified digital image.

Example 15 is a wearable device optionally comprising: a frame configured for wearing by a user; one or more optical elements mounted on the frame; an array having a plurality of light emitting diodes coupled to the one or more optical elements, wherein the one or more optical elements and the array are mounted within a field of view of the user when the frame is worn by the user, and wherein the array comprises a bus having a sinuously curved shape along a length and a width of the one or more optical elements; and additional onboard electronic components carried by the frame including at least a battery that is configured to provide for electrically powered operation of the array.

Example 16 can optionally be the wearable device of Example 15, wherein the plurality of light emitting diodes can be positioned along the bus and electrically connected together as a shift register.

Example 16A can optionally be the wearable device of any one or combination of Examples 15-16, wherein optionally at least some of the plurality of light emitting diodes can comprise a white light emitting diode module.

Example 17 can optionally be the wearable device of any one or combination of Examples 15-16A, wherein the onboard electronic components carried by the frame can optionally include one or more cameras configured for at least one of head tracking or eye tracking of the user.

Example 18 can be a system including a wearable device, the system optionally comprising: smart glasses optionally comprising: a frame configured for wearing by a user, an elongated temple connected to the frame, one or more optical elements mounted on the frame, onboard electronic components carried by at least one of the frame and the temple, the onboard electronic components including an array having a plurality of light emitting diodes coupled to the one or more optical elements, one or more cameras, a communication module and a battery that is configured to provide for electrically powered operation of the array, and a second electronic device remote from the smart glasses, the second electronic device comprising: an image processor configured to receive an initial digital image from the one or more cameras of the smart glasses, wherein the initial digital image includes data indicative of head tracking or eye tracking of the user, a communication module coupled to the image processor and configured to communicate with the communication module of the smart glasses, and a memory coupled to the image processor and storing instructions that, when executed by the image processor, cause the second electronic device to: perform a first one or more edits on the initial digital image, generate, based on the first one or more edits, a modified digital image, and transmit the modified digital image using the communication module as a basis to the smart glasses to illuminate a desired portion of the one or more optical elements according to the modified digital image.

Example 19 can optionally be the system of Example 18, wherein the one or more of the plurality of light emitting diodes can optionally be illuminated in a coordinated manner to shift an illumination location along the array and the one or more optical elements according to the signal derived from the at least one of head tracking or eye tracking.

Example 20 can optionally be the system of any one of Examples 18-19, wherein the array can optionally comprise at least one of: a bus having a sinuously curved shape along a length and a width of the one or more optical elements and a plurality of columns and a plurality of rows of the plurality of light emitting diodes spaced apart from one another and electrically connected in grids, and wherein with either the bus or the plurality of columns and the plurality of rows, the plurality of light emitting diodes comprise a plurality of groups of three light emitting diodes, wherein for each of the plurality of groups, the three light emitting diodes comprise a red row line at a first end portion, a blue row line at a second end portion and a green row line positioned between the red row line and the blue row line.

What is claimed is:

1. A wearable device comprising:
a frame configured for wearing by a user;
an elongate temple connected to the frame;
one or more cameras integrated into a body of a rim of the frame, the one or more cameras directly pointed toward one or more eyes of the user when the frame is worn by the user to capture movement of the one or more eyes of the user for eye tracking purposes;
one or more optical elements mounted on the frame;
an array having a plurality of light emitting diodes coupled to the one or more optical elements, wherein the one or more optical elements and the array are mounted within a field of view of the user when the frame is worn by the user; and
additional onboard electronic components carried by the frame or the elongate temple including at least a battery that is configured to provide for electrically powered operation of the array.

2. The wearable device of claim 1, wherein the array comprises a plurality of columns and a plurality of rows of the plurality of light emitting diodes spaced apart from one another and electrically connected in grids, wherein for each of the plurality of columns and each of the plurality of rows, each of the plurality of light emitting diodes are spaced apart from one another by at least between 350 microns and 400 microns, inclusive.

3. The wearable device of claim 1, wherein the array comprises a plurality of columns and a plurality of rows of the plurality of light emitting diodes spaced apart from one another and electrically connected in grids, wherein the array has between 75 columns and 150 columns, inclusive, and wherein the array has between 75 rows and 150 rows, inclusive.

4. The wearable device of claim 1, wherein the array comprises a plurality of columns and a plurality of rows of the plurality of light emitting diodes spaced apart from one another and electrically connected in grids, wherein each of the plurality of light emitting diodes has a rectangular shape and has a size that does not exceed 20 microns in a width dimension and 30 microns in a height dimension.

5. The wearable device of claim 1, wherein the plurality of light emitting diodes comprise a plurality of groups of three light emitting diodes, wherein for each of the plurality of groups, the three light emitting diodes comprise a red row line at a first end portion, a blue row line at a second end portion and a green row line positioned between the red row line and the blue row line.

6. The wearable device of claim 5, wherein the green row line is disposed on a different layer of the array from the blue row line and the red row line.

7. The wearable device of claim 1, wherein the array comprises a bus having a sinuously curved shape along a length and a width of the one or more optical elements.

8. The wearable device of claim 7, wherein the plurality of light emitting diodes are positioned along the bus and electrically connected together as a shift register.

9. The wearable device of claim 8, wherein at least some of the plurality of light emitting diodes comprise a white light emitting diode module that is electrically connected to a first electrically conductive trace and a second electrically conductive trace.

10. The wearable device of claim 1, wherein one or more of the plurality of light emitting diodes are configured to illuminate a desired portion of the one or more optical elements according to a signal derived from the eye tracking to create an augmented reality for the user when wearing the frame and viewing through the one or more optical elements.

11. The wearable device of claim 10, wherein the plurality of light emitting diodes are illuminated in a coordinated manner to shift an illumination location along the array and the one or more optical elements according to the signal derived from the eye tracking.

12. The wearable device of claim 11, wherein the additional onboard electronic components further include:

an image processor configured to receive an initial digital image from the one or more cameras;

a communication module coupled to the image processor; and a memory coupled to the image processor and storing instructions that, when executed by the image processor, cause the wearable device to:

perform a first one or more edits on the initial digital image, generate, based on the first one or more edits, a modified digital image, and transmit the modified digital image using the communication module as a basis to illuminate the desired portion of the one or more optical elements according to the modified digital image.

13. A wearable device comprising:

a frame configured for wearing by a user, one or more cameras integrated into a bridge of the frame, the one or more cameras directly pointed toward one or more eyes of the user;

an elongate temple connected to the frame;

one or more optical elements mounted on the frame;

an array having a plurality of light emitting diodes coupled to the one or more optical elements, wherein the one or more optical elements and the array are mounted within a field of view of the user when the frame is worn by the user;

a battery carried by one of the elongate temple or the frame and powering the array and the one or more cameras; and an image processor configured to receive an initial digital image from the one or more cameras, wherein the initial digital image includes data indicative of eye tracking of the user, and wherein the plurality of light emitting diodes are illuminated in a coordinated manner to shift an illumination location along the array and the one or more optical elements according to a signal derived from the eye tracking.

14. The wearable device of claim 13, wherein the plurality of light emitting diodes are positioned along a bus and electrically connected together as a shift register.

15. The wearable device of claim 14, wherein at least some of the plurality of light emitting diodes comprises a white light emitting diode module.

16. The wearable device of claim 13, wherein the array comprises a bus having a sinuously curved shape along a length and a width of the one or more optical elements.

17. The wearable device of claim 13, wherein the array includes plurality of columns and a plurality of rows of the plurality of light emitting diodes spaced apart from one another and electrically connected in grids, and wherein the plurality of light emitting diodes comprise a plurality of groups of three light emitting diodes, wherein for each of the plurality of groups, the three light emitting diodes comprise a red row line at a first end portion, a blue row line at a second end portion and a green row line positioned between the red row line and the blue row line.

18. A wearable device comprising:

a frame configured for wearing by a user;

an elongate temple connected to the frame;

one or more cameras integrated into a body of a pair of rims of the frame, the one or more cameras directly pointed toward one or more eyes of the user when the frame is worn by the user to capture movement of the one or more eyes of the user for eye tracking purposes, and wherein the one or more cameras comprise at least two cameras for each of the pair of rims of the frame;

one or more optical elements mounted on the frame;

an array having a plurality of light emitting diodes coupled to the one or more optical elements, wherein the one or more optical elements and the array are mounted within a field of view of the user when the frame is worn by the user; and additional onboard electronic components carried by the frame or the elongate temple including at least a battery that is configured to provide for electrically powered operation of the array.

\* \* \* \* \*